United States Patent [19]
Ichikawa et al.

[11] 3,717,613
[45] Feb. 20, 1973

[54] PROCESS FOR PREPARING COPOLYMERS

[75] Inventors: Mitsuo Ichikawa; Yasumasa Takeuchi; Yoshiyuki Harita; Masayuki Endo, all of Yokkaichi; Nobuo Yamaguchi, Mie; Mitsuru Tashiro; Akira Kogure, both of Yokkaichi, all of Japan

[73] Assignee: Japan Synthetic Rubber Co., Ltd., Tokyo, Japan

[22] Filed: March 11, 1970

[21] Appl. No.: 18,722

[30] Foreign Application Priority Data

March 14, 1969 Japan.................................44/9292

[52] U.S. Cl...........260/63 R, 252/429 A, 252/431 R, 252/431 C, 252/431 N, 260/63 BB, 260/67 UA, 260/78.5 BB, 260/79.7, 260/80.3 R, 260/80.3 N, 260/80.6, 260/80.7, 260/80.8, 260/80.81, 260/82.5, 260/83.5, 260/84.1, 260/85.3, 260/85.5 M, 260/86.1 E, 260/86.3, 260/86.7

[51] Int. Cl.................................................C08f 1/56

[58] Field of Search....260/78.5 BB, 82.5, 83.5, 84.1, 260/85.3, 94.3, 80.6, 80.7, 63 BB, 63 HA, 63 UY, 67 UA, 79.7, 80.3 R, 80.3 N, 80 C, 85.5 M, 86.1, 80.8, 80.81, 86.3; 252/429 C, 431 R, 431 N, 431 P

[56] References Cited

UNITED STATES PATENTS

| | | | |
|---|---|---|---|
| 3,432,513 | 3/1969 | Miller et al. | 260/93.7 |
| 3,457,244 | 7/1969 | Fukuda et al. | 260/80.78 |

OTHER PUBLICATIONS

Razuvayev et al., Polymerization of Vinylchloride in the Presence of the System Alkylaluminium-Alkylhalide, Polymerscience, U.S.S.R. 1965, 597–604.

*Primary Examiner*—James A. Seidleck
*Assistant Examiner*—John Kight, III
*Attorney*—Ward, McElhannon, Brooks & Fitzpatrick

[57] ABSTRACT

A catalyst comprising an organoaluminum compound, an organic halogen compound containing labile halogen atom, and a compound of metal of Groups IV B–VII B or Group VIII of Deming's Periodic table is useful for copolymerizing conjugated dienes, conjugated heterodienes and, if desired, monoolfins to produce an alternate copolymer.

10 Claims, No Drawings

PROCESS FOR PREPARING COPOLYMERS

This invention relates to a process for the preparation of copolymers, in particular, alternate copolymers of conjugated diene with conjugated heterodienes along or together with monoolefins.

By "conjugated heterodiene" is meant an organic compound containing two conjugated multiple bonds one of which is between a carbon atom and a nonmetallic atom other than carbon, especially O, S and N.

Heretofore, free radical polymerization with various peroxides and other initiators has been commercially carried out for copolymerizing conjugated dienes with conjugated heterodienes, either alone or with monoolefins. However, such processes have not been successful in producing significant alternation in the repeating monomer residues. As a result the full potential of copolymerization in this field has not previously been tested.

Japanese Patent Publication No. 10996/1966 and Japanese Patent Publication No. 15984/1968 disclose a process for preparing alternate copolymer of monoolefins with conjugated heterodienes in the presence of organoaluminum halides. However, the combination of monomers used in this invention are not disclosed. When conjugated dienes and conjugated heterodienes are copolymerized in the presence of an organoaluminum halide, the copolymer is either not formed at all or the yield is so low that commercial production by this method is not feasible.

The present inventors have previously proposed a process for preparing effectively a copolymer which comprises reacting a conjugated diene with a conjugated heterodiene and, if desired, additionally an olefin in the presence of organoaluminum compounds and organic halogen compounds containing a labile halogen atom.

As the result of further research, the present inventors have found that addition of a compound of metal of Groups IVB–VIIB or Group VIII of Deming's Periodic table to a catalyst system of organoaluminum compounds and organic halogen compounds improves remarkably polymerization activity of the latter catalyst system and this new ternary catalyst system can give copolymers of higher degree of alternation and of excellent quality.

According to one aspect of the present invention there is provided a process for preparing a binary copolymer described hereafter which comprises reacting two monomers selected from the group consisting of conjugated diene (D) hereafter defined and conjugated heterodiene (H) hereafter defined, in the presence of catalyst components A (organo-aluminum compound), B (organic halogen compound containing a labile halogen atom) and C (compound of metal of Groups IVB–VIIB or VIII of Deming's Periodic table).

According to another aspect of the invention there is provided a process for preparing a multicomponent copolymer which is described hereafter and which comprises reacting at least three monomers selected from at least one conjugated diene (D), at least one conjugated heterodiene (H), and mono-olefin or derivative thereof (O) hereafter defined which optionally can be employed in the presence of catalyst components A, B and C.

CATALYST COMPONENT A

This is an organoaluminum compound of the formula:

$$Al\ R^1\ R^2\ R^3$$

where $R^1$ and $R^2$ are, similar or dissimilar, selected from the group consisting of alkyl, cycloalkyl, aryl, aralkyl and alkoxy; and $R^3$ is selected from the group consisting of hydrogen, alkyl, cycloalkyl, aryl, aralkyl and alkoxy. The alkyl group in the formula is preferably that containing one to eight carbon atoms such as methyl, ethyl, propyl, isopropyl, butyl, isobutyl, pentyl, hexyl, and octyl. The cycloalkyl group may be, for example, cyclohexyl. The aryl group may be, for example, phenyl or tolyl. The aralkyl group may be, for example, benzyl. The alkoxy may be, for example, methoxy, ethoxy, propoxy, isopropoxy or butoxy.

As representative examples of the organoaluminum compound (catalyst component A), there may be mentioned trimethylaluminum, triethylaluminum, triisobutylaluminum, trihexylaluminum, triphenylaluminum, triisopropoxyaluminum, diethylaluminum ethoxide, diethylaluminum hydride, and diisobutylaluminum hydride.

CATALYST COMPONENT B

This is an organic halogen compound containing a labile halogen atom of the formula:

where X is halogen; $Q^1$ is selected from the group consisting of hydrogen, halogen, alkyl, alkenyl, aryl, and aralkyl; $Q^2$ and $Q^3$ are, similar or dissimilar, selected from the group consisting of hydrogen, halogen, alkyl, alkenyl, aryl, aralkyl, nitrile, $-OR^{11}$, $-SR^{12}$, $-NR^{13}R^{14}$, $-CONR^{15}R^{16}$,

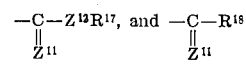

where $R^{11}$, $R^{12}$, $R^{13}$, $R^{14}$, $R^{15}$, $R^{16}$ and $R^{17}$ are, similar or dissimilar, selected from the group consisting of hydrogen, alkyl, cycloalkyl, aryl and aralkyl, $Z^{11}$ and $Z^{12}$ are, similar or dissimilar, selected from the group consisting of oxygen and sulfur, $R^{18}$ is selected from the group consisting of halogen, hydrogen, alkyl, cyclalkyl, aryl and aralkyl. Further, $Q^2$ and $Q^3$ may be, similar or dissimilar, selected from the group consisting of substituted alkyl substituted alkenyl, substituted aryl and substituted aralkyl and the substituent being selected from the group consisting of halogen, nitrile, $-OR^{11}$, $-SR^{12}$, $-NR^{13}R^{14}$, $-CONR^{15}R^{16}$,

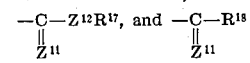

where $R^{11}$, $R^{12}$, $R^{13}$, $R^{14}$, $R^{15}$, $R^{16}$, $R^{17}$ and $R^{18}$ are as defined above.

As representative examples of catalyst component B, there may be mentioned halogenated hydrocarbons, halogenated organic acids, halogenated organic acid esters, halogenated aldehydes, halogenated alcohols, halogenated ethers, halogenated nitriles, halogenated acid halides, and halogenated acid amides. As halogenated hydrocarbons, there are preferably used carbon tetrachloride, chloroform, tert-butyl chloride, allyl chloride, 3-chloro-2-methylpropene-1, 1-chlorobutene-2, 1,4-dichlorobutene-2, benzyl chloride, benzylidene chloride, and bis(chloromethyl) benzene. As halogenated organic acids, there are preferably used trichloroacetic acid, dichloroacetic acid, monochloroacetic acid, tribromoacetic acid, and trifluoroacetic acid. As halogenated organic acid esters, there are preferably used ethyl trichloroacetate, ethyl tribromoacetate, and ethyl trifluoroacetate. As halogenated aldehydes, there are preferably used chloral and bromal. As halogenated alcohol, 2,2,2-trichloroethanol is preferably used. As halogenated ether, 2,2,2-trichlorodiethyl ether is preferably used. As halogenated nitrile, trichloroacetonitrile is preferably used. As halogenated acid halide, trichloroacetyl chloride is preferably used. And as halogenated acid amide, trichloroacetamide is preferably used.

CATALYST COMPONENT C

The catalyst component C is a compound of metal of Groups IVB–VIIB or Group VIII of Deming's Periodic table.

As metal of the Group IVB, titanium and zirconium are preferable. As metal of the Group VB, vanadium is preferable. As metal of the Group VIB, chromium, molybdenum and tungsten are preferable. As metal of the Group VIIB, manganese is preferable. As metal of Group VIII, iron, cobalt, nickel, ruthenium, rhodium and palladium are preferable.

As catalyst component C, inorganic compounds, organic compounds and complex compounds of those metals are preferably used.

As representative examples of the metal compounds, there may be mentioned halides, sulfates, nitrates, carbonates, phosphates, cyanides, thiocyanides, sulfides, hydroxides, oxides, oxyhalides, alkoxides, acid esters and organic acid salts of the metals, and complex compounds having as ligand phosphine, phosphite, carbonyl, isonitrile, dipyridyl, vinyl compound, cyclopentadienyl, $\pi$-allyl, acetylacetone, and acetoacetic acid ester. Further, concrete examples of these metal compounds are:

$TiCl_4$, $Ti(OC_4H_9)_4$, $TiCl(OC_4H_9)_3$, $TiCl_2(OC_4H_9)_2$, $TiCl_3(OC_4H_9)$, $TiO(C_5H_7O_2)_2$, $Ti(C_5H_7O_2)_3$, $Ti(C_5H_5)_2$, $VCl_4$, $VOCl_3$, $VO(OC_2H_5)_3$, $VO(OC_4H_9)_3$, $VO(C_5H_7O_2)_3$, $VCl_3(OC_4H_9)$, $VCl_2(OC_4H_9)_2$, $VCl(OC_4H_9)_3$, $CrCl_3$, $Cr(C_5H_7O_2)_3$, $MoCl_5$, $MoO_2(C_5H_7O_2)_2$, $MnCl_2$, $Mn(C_5H_7O_2)_2$, $Mn(C_5H_7O_2)_3$, $FeCl_3$, $Fe(OC_4H_9)_3$, $Fe(C_5H_7O_2)_3$, $Fe(octoate)$, $Fe(stearate)$, $Fe(C_5H_5)_2$, $CoCl_2$, $Co(C_5H_7O_2)_3$, $NiCl_2$, and $Ni(C_5H_7O_2)_2$.

By combining the catalyst component C with the catalyst components A and B, polymerization activity of the catalyst is remarkably enhanced so that the polymerization temperature and the amount of catalyst to be used are lowered as compared with the binary catalyst consisting of the catalyst component A and the catalyst component B. Furthermore, the new ternary catalyst system can give copolymers of higher degree of alternation and of excellent quality.

The conjugated dienes (D) used in this invention are preferably those having four to 12 carbon atoms which may be of straight chain, branched chain and ring form. Representative conjugated dienes are straight chain conjugated dienes such as butadiene, pentadiene, hexadiene, heptadiene, octadiene and the like; branched chain conjugated dienes such as isoprene, 2-ethylbutadiene, 2-tert-butylbutadiene, 3-methylheptatriene-1, 4, 6 and the like; and cyclic conjugated dienes such as cyclohexadiene, cyclopentadiene and the like, and substituted conjugated dienes such as chloroprene, 2,3-dichlorobutadiene and the like. Particularly preferred are butadiene, isoprene, pentadiene and chloroprene.

The conjugated heterodienes (H) used in this invention may include those represented by the following formulas:

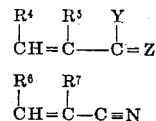

where:

$R^4$, $R^5$, $R^6$, and $R^7$ are similar or dissimilar and are selected from the group consisting of hydrogen, halogen, alkyl, aryl, aralkyl, nitrile, $-COOR^{21}$ (where $R^{21}$ is selected from the group consisting of hydrogen, alkyl, cycloalkyl, aryl or aralkyl) and hydrocarbon residues having a substituent selected from the group consisting of halogen and $-COOR^{21}$ where $R^{21}$ is as defined above; Y is selected from the group consisting of halogen, $-R^{22}$, $-OR^{23}$, $-NR^{24}R^{25}$ and $-SR^{26}$ where $R^{22}$, $R^{23}$, $R^{24}$, $R^{25}$ and $R^{26}$ are, similar or dissimilar, selected from the group consisting of hydrogen, alkyl, cycloalkyl, aryl and aralkyl; and Z is selected from the group consisting of oxygen and sulfur. Further, when the conjugated heterodienes of the above formulas have a carboxyl group, the corresponding acid anhydride is also within the scope of the conjugated heterodienes used in this invention.

Representative examples of the conjugated heterodienes (H) are unsaturated carboxylic acids, unsaturated carboxylic acid esters, unsaturated aldehydes, unsaturated acid halides, unsaturated acid amides, unsaturated keytones, unsaturated thiolic acids, unsaturated thiolic acid esters, unsaturated thionic acids, unsaturated thionic acid esters, and unsaturated nitrile compounds.

Among the above mentioned compounds the following compounds are employed preferably:

unsaturated carboxylic acid
   acrylic acid, methacrylic acid, crotonic acid, cinnamic acid, maleic acid, fumaric acid, itaconic acid, and maleic anhydride;
unsaturated carboxylic acid ester
   methyl acrylate, ethyl acrylate, butyl acrylate, octyl acrylate, methyl methacrylate, ethyl methacrylate, butyl methacrylate, octyl methacrylate, methyl crotonate, methyl cinnamate, monomethyl maleate, dimethyl maleate, monomethyl fumarate, dimethyl fumarate, ethyl itaconate, and diethyl itaconate;
unsaturated aldehyde
   acrolein, methacrolein;
unsaturated acid halide
   acryloyl chloride;
unsaturated acid amide
   acrylamide, and methacrylamide;
unsaturated ketone
   methyl vinyl ketone, and methyl isopropenyl ketone;
unsaturated nitrile compound
   acrylonitrile, methacrylonitrile, chloroacrylonitrile, and vinylidene cyanide.

Particularly preferable compounds are acrylonitrile, methacrylonitrile, methyl acrylate, ethyl acrylate, butyl acrylate, methyl methacrylate, ethyl methacrylate, butyl methacrylate, maleic anhydride, and dimethyl fumarate.

The monoolefins (O) used in this invention together with the above-mentioned conjugated dienes (D) and conjugated heterodienes (H) are those containing two to 16 carbon atoms.

Representative monoolefins are aliphatic straight chain olefins such as ethylene, propylene, butene-1, butene-2, isobutene, pentene-1, pentene-2, 2-methylbutene-1, 3-methyl-butene-1, 2-methylbutene-2, hexene-1, hexene-2, 2-methyl-pentene-1, dodecene-1 and the like; aliphatic cyclic (including bridge or aromatic fused ring) olefins such as cyclobutene, cyclopentene, cyclooctene, norbornene, indene and the like; aromatic vinyl compounds such as styrene, α-methyl-styrene, vinyl toluene, vinyl naphthalene, N-vinylcarbazole and the like; vinyl ester compounds such as vinyl acetate, vinyl propionate and the like; vinyl ether compounds such as methyl vinyl ether, ethyl vinyl ether, isobutyl vinyl ether and the like; and halogen substituted olefins such as vinyl chloride, vinylidene chloride and the like.

The catalyst components may be used in an optional ratio with respect to the monomers. In general it is preferable to use 0.0001 to 10 moles of catalyst (based on catalyst component A) per one mole of a conjugated heterodiene, particularly preferred is a ratio of 0.0015 to 5 moles catalyst per mole of conjugated heterodiene.

The ratio of catalyst component B to catalyst component A may be optionally selected through the preferable ratio is varied depending upon the type of catalyst component C. The ratio is preferably 0.05 to 20 moles (particularly 0.1 to 10 moles) of catalyst component B per mole of catalyst component A. Further, the ratio of catalyst component C to catalyst component A is generally 0.0001–10 moles (component C) per 1 mole (component A), preferred with 0.0001–1 mole per 1 mole.

The process of this invention may be effected in the presence or absence of solvent. As the solvent, hydrocarbon solvents or halogenated hydrocarbon solvents may be used. As hydrocarbon solvents, there may be mentioned, for example, aliphatic hydrocarbons such as pentane, hexane, heptane, octane and the like; aromatic hydrocarbons such as benzene, toluene and the like; and alicyclic hydrocarbons such as cyclohexane and the like. As halogenated hydrocarbons, there may be mentioned, for example, solvents inert to catalyst component A such as methylene chloride, tetrachloroethylene, chlorobenzene, dichlorobenzene and the like.

These solvents prevent an undue increase in viscosity during polymerization and are effective to carry out smooth polymerization. It is also possible to use an excess of a monomer itself as a solvent.

The polymerization temperature is not critical but it is preferable to effect the polymerization within a temperature range of −80°C to 150°C.

Neither is the reaction pressure critical, to the extent that the reaction mixture can be retained in a liquid state under pressure if necessary or desired.

The polymerization reaction is preferably carried out in an inert gas atmosphere. After the completion of the polymerization reaction, the product may be recovered by conventional methods.

Further, by the present invention there is provided an alternate copolymer comprising at least two residues of monomers selected from the group consisting of conjugated diene (D) and conjugated heterodiene (H), (The residues of the respective monomers being designated D and H) wherein any one of residue of D and H is linked to the other type of residue H and D, respectively.

Furthermore, by the present invention there is provided an alternate copolymer comprising at least one residue of conjugated dienes (D) at least one residue of conjugated heterodienes (H) and at least one residue of monoolefins or derivatives thereof (O) in which the repeating unit comprises two types of residues, one type being residue H and the other type being residue D or O, wherein a residue of any one of the types is linked to a residue of the other type. The invention includes both random sequences and specific chain sequences such as

D — H — D — H' — D — H — D — H'    (1)

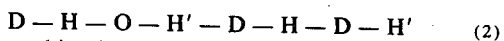

D — H — O — H' — D — H — D — H'    (2)

The combination of monomers employed in this invention is a combination of two or more members selected from the class consisting of conjugated dienes (D) and conjugated heterodienes (H) or a combination of monoolefins (O) and the above-mentioned combination. In other words, when a monoolefin is used at least one conjugated diene and at least one conjugated heterodiene must be combined with it.

More than one compound from any one of the three general types may be used in any one copolymer. For example the combinations of monomers reacted may include:

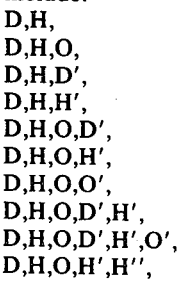

D,H,
D,H,O,
D,H,D',
D,H,H',
D,H,O,D',
D,H,O,H',
D,H,O,O',
D,H,O,D',H',
D,H,O,D',H',O',
D,H,O,H',H'',

Representative combinations are as follows:

Binary Copolymer

Butadiene — acrylonitrile
Butadiene — methyl methacrylate
Butadiene — methyl acrylate
Butadiene — acrolein
Butadiene — chloroprene
Isoprene — acrylonitrile
Isoprene — methyl methacrylate
Isoprene — methyl acrylate
Isoprene — acrolein
Pentadiene — acrylonitrile
Pentadiene — methyl methacrylate
Pentadiene — methyl acrylate
Pentadiene — acrolein
Cyclopentadiene — acrylonitrile
Acrylonitrile — methacrylic acid
Acrylonitrile — acrolein

Ternary Copolymer

Butadiene — acrylonitrile — methyl methacrylate
Butadiene — acrylonitrile — styrene
Butadiene — acrylonitrile — isobutene
Butadiene — acrylonitrile — butene — 1
Butadiene — acrylonitrile — acrolein
Butadiene — methyl methacrylate — styrene
Butadiene — methyl methacrylate — isobutene
Butadiene — methyl methacrylate — butene — 1
Butadiene — isoprene — acrylonitrile Butadiene — isoprene — methyl methacrylate
Butadiene — chloroprene — acrylonitrile
Butadiene — chloroprene — methacrylic acid
Butadiene — pentadiene — acrylonitrile
Butadiene — pentadiene — methyl methacrylate
Butadiene — maleic anhydride — acrylonitrile
Butadiene — maleic anhydride — methacrylonitrile
Butadiene — maleic anhydride — butene — 1
Butadiene — maleic anhydride — isobutene
Isoprene — acrylonitrile — methyl methacrylate
Isoprene — acrylonitrile — styrene
Isoprene — acrylonitrile — isobutene
Isoprene — methyl methacrylate — styrene
Isoprene — methyl methacrylate — isobutene
Isoprene — maleic anhydride — acrylonitrile
Isoprene — maleic anhydride — methacrylonitrile
Isoprene — maleic anhydride — butene — 1
Isoprene — maleic anyydride — isobutene According to the process of this invention, alternate copolymers can be obtained. When butadiene and acrylonitrile are copolymerized in the presence of the catalyst system of this invention, the monomer reactivity ratios thereof are low (for example, when the polymerization is effected in heptane at 40°C in the presence of a catalyst comprising triethylaluminum-trichloroacetic acid-ferric butoxide, $\gamma_{BD}$ is 0.04, $\gamma_{AN}$ is 0.085 and therefore, $\gamma_{BD} \times \gamma_{AN} = 0.0034$ where $\gamma_{AN}$ is monomer reactivity ratio of acrylonitrile and, $\gamma_{BD}$ is of butadiene,) and thereby a highly alternate copolymer can be obtained. The mechanism is believed to depend on the fact that a monomer coordinated to the catalyst reacts sparingly with the same kind of monomer, but easily reacts with a different one of the monomer types and the reaction is accelerated by the addition of the other types of monomer. However, this invention should not be understood as being restricted by the theoretical mechanism. The state of bonding of the monomer units in the copolymer produced by the process of this invention varies depending upon the combination of catalyst components, the combination of monomers, and the polymerization conditions. As shown in the Examples below, some copolymer obtained by the process of this invention contain the monomer units in an alternate bonding state of almost 1:1 or at least in a highly alternate bonding state, regardless of the ratio of charged monomers and the polymer yield.

Even when the ratio of monomers used in the original feed in not 1:1 in the case of some binary copolymer, the ratio of monomer units in the resulting copolymer is almost 1:1, and in a similar way, some ternary copolymer containing a constant ratio of monomer units can be obtained. Excess of conjugated heterodiene monomer charged to the copolymerization system will in general act simply as solvent and can be used for this purpose. The effect of the excess monomer is in general to raise catalyst activity, increase the molecular weight of the resulting copolymer, and to form the alternate copolymer more effectively.

The copolymers obtained by the process of this invention are novel and a feature of this invention is to provide such novel copolymers.

The novel alternate copolymers obtained according to this invention can be of high molecular weight, and their properties range from rubber-like to plastic depending upon the combination of monomers used. The preferred novel copolymers have particularly good strength and can be used in various fields where conventional rubber and plastics have been used. Furthermore, it is possible to apply the novel copolymers to new fields where their particular characteristics can be effectively utilized.

The following examples are given for illustrating the present invention, but not for limiting the scope of this invention.

EXAMPLES 1–103 AND

REFERENCE EXAMPLES 1–12

A 100 ml. ampoule is dried sufficiently, and nitrogen gas is substituted several times. Then, according to the formulation of Table below, there are added to the ampoule a dried solvent at 10°C, a molar solution of respective organic-halogen compounds as catalyst component B in a solvent, a 0.1 molar solution of a transition metal compound as catalyst component C in a solvent, followed by agitating for 5 minutes. Then, there is further added a molar solution of respective organoaluminum compound as catalyst component A in a solvent, followed by agitating further for 15 minutes, and after agitation conjugated heterodiene compound and conjugated diene compound, and if desired olefin are added. Immediately, the ampoule is sealed. All the procedures as above are carried out in a nitrogen atmosphere.

The ampoule is rotated in a rotating polymerization vessel to effect copolymerization. After a determined time, the ampoule is opened and then a small amount of phenyl-$\beta$-naphthylamine is added thereto and mixed thoroughly to stop the copolymerization. The reaction mixture is poured into a hydrochloric acid-methanol solution containing antioxidant to decompose and dissolve the catalyst and simultaneously the resulting copolymer is precipitated. The precipitated copolymer is separated and washed several times with methanol containing antioxidant, and dried at 40°C under reduced pressure overnight. The result is shown table below.

The symbols in the following table are defined as below:

Et; ethyl
Bu; butyl
AcAc; acetyl acetone
AN; acrylonitrile
BD; butadiene
Hex; hexyl
TCA; trichloroacetic acid
MMA; methyl methacrylate
IP; isoprene
CP; chloroprene
MAN; methacrylonitrile
MAn; maleic anhydride
ST; styrene
Oct; octenic acid
Ste; stearic acid
IB; isobutylene

| Example number | Catalyst: Component A (m.mole) | | Component B (m.mole) | | Component C (m.mole) | | Monomer: Conjugated heterodiene, mole | | Conjugated diene, mole | | | | Copolymerization condition: Solvent, ml. | | Temp. (° C.) | Time (hrs.) | Yield: Gr. | Per-cent | Analysis, percent: H | C | N | Cl | O | Note |
|---|---|---|---|---|---|---|---|---|---|---|---|---|---|---|---|---|---|---|---|---|---|---|---|---|
| 1 | AlEt3 | 2 | CCl3COOH | 2 | Mn(AcAc)3 | 0.1 | AN | 0.1 | BD | 0.1 | | | Toluene | 23 | 75 | 18 | 4.40 | 41 | 8.70 | 77.47 | 10.66 | | | (1) |
| 2 | AlEt3 | 2 | CCl3COOH | 2 | Cr(AcAc)3 | 0.1 | AN | 0.1 | BD | 0.1 | | | do | 23 | 40 | 18 | 1.12 | 10.5 | 8.70 | 78.32 | 10.82 | | | |
| 3 | AlEt3 | 2 | CCl3COOH | 2 | Cr(AcAc)3 | 0.1 | AN | 0.1 | BD | 0.1 | | | do | 23 | 75 | 18 | 7.75 | 72 | | | | | | |
| 4 | AlEt3 | 2 | CCl3COOH | 2 | TiO(AcAc)2 | 0.1 | AN | 0.1 | BD | 0.1 | | | do | 23 | 40 | 18 | 1.38 | 13 | 8.78 | 78.13 | 10.91 | | | |
| 5 | AlEt3 | 2 | CCl3COOH | 2 | TiO(AcAc)2 | 0.1 | AN | 0.1 | BD | 0.1 | | | do | 23 | 75 | 18 | 5.63 | 53 | | | | | | |
| Reference 1 | AlEt3 | 2 | CCl3COOH | 2 | | | AN | 0.1 | BD | 0.1 | | | do | 23 | 40 | 18 | 0.08 | 0.8 | | | | | | |
| Reference 2 | AlEt3 | 2 | CCl3COOH | 2 | | | AN | 0.1 | BD | 0.1 | | | do | 23 | 75 | 18 | 3.06 | 29 | | | | | | |
| 6 | AlEt3 | 2 | CCl3COOH | 2 | VO(OBu)3 | 0.1 | AN | 0.1 | BD | 0.1 | | | do | 23 | 55 | 18 | 1.68 | 15.5 | 8.99 | 79.81 | 10.93 | | | |
| 7 | AlEt3 | 2 | CCl3COOH | 2 | VO(OEt)3 | 0.1 | AN | 0.1 | BD | 0.1 | | | do | 23 | 55 | 18 | 1.75 | 16 | 8.87 | 77.99 | 10.86 | | | |
| 8 | AlEt3 | 2 | CCl3COOH | 2 | VOCl3 | 0.1 | AN | 0.1 | BD | 0.1 | | | do | 32 | 55 | 18 | 1.80 | 17 | 8.71 | 77.87 | *10.95 | | | (2) |
| 9 | AlEt3 | 2 | CCl3COOH | 2 | Ti(OBu)4 | 0.1 | AN | 0.1 | BD | 0.1 | | | do | 32 | 55 | 18 | 3.11 | 29 | 8.84 | 78.43 | 10.61 | | | |
| 10 | AlEt3 | 2 | CCl3COOH | 2 | TiO(AcAc)2 | 0.1 | AN | 0.1 | BD | 0.1 | | | do | 23 | 55 | 18 | 2.70 | 25 | 8.87 | 78.34 | 10.96 | | | |
| 11 | AlEt3 | 2 | CCl2COOH | 2 | TiCl4 | 0.1 | AN | 0.1 | BD | 0.1 | | | do | 32 | 55 | 18 | 3.38 | 31.5 | 8.81 | 78.80 | 11.01 | | | |
| Reference 3 | AlEt3 | 2 | CCl3COOH | 2 | | | AN | 0.1 | BD | 0.1 | | | do | 33 | 55 | 18 | 1.12 | 10.5 | 8.87 | 77.65 | 10.74 | | | |
| 12 | Al(i-Bcl)3 | 2 | CCl3COOH | 2 | TiCl4 | 0.2 | AN | 0.1 | BD | 0.1 | | | do | 29 | 40 | 18 | 1.62 | 15 | 9.28 | 79.18 | 10.68 | | | |
| 13 | Al(Hex)3 | 2 | CCl3COOH | 2 | TiCl4 | 0.2 | AN | 0.1 | BD | 0.1 | | | do | 29 | 40 | 18 | 2.03 | 19 | 9.09 | 79.20 | 10.23 | | | |
| 14 | AlEt2H | 2 | CCl3COOH | 2 | Ti(OBu)4 | 0.2 | AN | 0.1 | BD | 0.1 | | | do | 29 | 40 | 17 | 1.33 | 12.4 | | | | | | |
| 15 | AlEt3 | 2 | CCl3COCl | 2 | Ti(OBu)4 | 0.2 | AN | 0.1 | BD | 0.1 | | | do | 29 | 40 | 18 | 1.92 | 18 | 9.25 | 78.48 | 10.66 | | | |
| 16 | AlEt3 | 2 | CCl3COOH | 2 | Ti(OBu)4 | 0.2 | AN | 0.1 | BD | 0.1 | | | do | 29 | 40 | 18 | 1.89 | 17.5 | | | | | | |
| 17 | AlEt3 | 2 | CCl3COOH | 2 | Ti(OBu)4 | 0.2 | AN | 0.3 | BD | 0.1 | | | do | 16 | 40 | 18 | 5.40 | *50.5 | | | | | | (*) |
| 18 | AlEt3 | 2 | CHCl2COOH | 2 | Ti(OBu)4 | 0.2 | AN | 0.3 | BD | 0.1 | | | do | 16 | 40 | 18 | 2.55 | *24 | | | | | | (*) |
| 19 | AlEt3 | 2 | CHCl2COOH | 2 | Ti(OBu)4 | 0.2 | AN | 0.3 | BD | 0.1 | | | do | 16 | 40 | 18 | 1.37 | *13 | | | | | | |
| 20 | AlEt3 | 2 | (12) | 2 | Ti(OBu)4 | 0.2 | AN | 0.3 | BD | 0.1 | | | do | 16 | 40 | 18 | 5.35 | *50 | | | | | | |
| Reference 4 | AlEt3 | 1 | CCl3COOH | 1 | Ti(OBu)4 | 0.1 | | | BD | 0.1 | | | do | 40 | 70 | 18 | 0.30 | 5.5 | | | | | | |
| 21 | AlEt3 | 1 | CCl3COOH | 1 | Ti(OBu)4 | 0.1 | AN | 0.1 | BD | 0.1 | | | do | 31 | 70 | 18 | 6.15 | 58 | | | | | | |
| Reference 5 | AlEt3 | 1 | | | Ti(OBu)4 | 0.1 | AN | 0.1 | BD | 0.1 | | | do | 32 | 70 | 18 | 0.62 | 5.8 | | | | | | |
| Reference 6 | | | CCl3COOH | 1 | Ti(OBu)4 | 0.1 | AN | 0.1 | BD | 0.1 | | | do | 32 | 70 | 18 | 0.22 | 2.0 | | | | | | |
| Reference 7 | AlEt3 | 1 | CCl3COOH | 1 | Ti(OBu)4 | | AN | 0.1 | BD | 0.1 | | | do | 32 | 70 | 18 | 3.42 | 32 | | | | | | |
| 22 | AlEt3 | 2 | CCl3COOH | 1 | Ti(OBu)4 | 0.2 | AN | 0.1 | BD | 0.1 | | | do | 30 | 40 | 18 | 1.93 | 18 | | | | | | |
| 23 | AlEt3 | 2 | CCl3COOH | 2 | Ti(OBu)4 | 0.2 | AN | 0.1 | BD | 0.1 | | | do | 29 | 40 | 18 | 2.99 | 28 | | | | | | |
| 24 | AlEt3 | 2 | CCl3COOH | 3 | Ti(OBu)4 | 0.2 | AN | 0.1 | BD | 0.1 | | | do | 28 | 40 | 18 | 3.20 | 30 | | | | | | |
| 25 | AlEt3 | 2 | CCl3COOH | 4 | Ti(OBu)4 | 0.2 | AN | 0.1 | BD | 0.1 | | | do | 27 | 40 | 18 | 2.47 | 23 | | | | | | |
| 26 | AlEt3 | 2 | CCl3COOH | 2 | Ti(OBu)4 | 1 | AN | 0.1 | BD | 0.1 | | | do | 30 | 40 | 18 | 1.19 | 11 | | | | | | |
| 27 | AlEt3 | 2 | CCl3COOH | 2 | Ti(OBu)4 | 0.2 | AN | 0.1 | BD | 0.1 | | | do | 29 | 40 | 18 | 2.89 | 27 | | | | | | |
| 28 | AlEt3 | 2 | CCl3COOH | 2 | Ti(OBu)4 | 0.04 | AN | 0.1 | BD | 0.1 | | | do | 37 | 40 | 18 | 1.64 | 15 | | | | | | |
| 29 | AlEt3 | 2 | CCl3COOH | 2 | Ti(OBu)4 | 0.02 | AN | 0.1 | BD | 0.1 | | | do | 29 | 40 | 18 | 1.42 | 13 | | | | | | |
| 30 | AlEt3 | 2 | CCl3COOH | 2 | Ti(OBu)4 | 0.002 | AN | 0.1 | BD | 0.1 | | | do | 31 | 40 | 18 | 0.80 | 7.5 | | | | | | |
| 31 | AlEt3 | 5 | CCl3COOH | 5 | Ti(OBu)4 | 0.5 | AN | 0.1 | BD | 0.1 | | | do | 20 | 70 | 18 | 10.06 | 95 | | | | | | |
| 32 | AlEt3 | 1 | CCl3COOH | 1 | Ti(OBu)4 | 0.1 | AN | 0.1 | BD | 0.1 | | | do | 31 | 70 | 18 | 6.15 | 58 | | | | | | |
| 33 | AlEt3 | 0.2 | CCl3COOH | 0.2 | Ti(OBu)4 | 0.02 | AN | 0.1 | BD | 0.1 | | | do | 34 | 70 | 18 | 1.65 | 15 | 8.88 | 79.32 | 10.96 | | | |
| 34 | AlEt3 | 2 | CCl3COOH | 2 | Ti(OBu)4 | 0.2 | AN | 0.1 | BD | 0.1 | | | Heptane | 32 | 40 | 18 | 6.04 | 57 | 8.17 | 73.15 | 12.46 | | | |
| 35 | AlEt3 | 2 | CCl3COOH | 2 | Ti(OBu)4 | 0.2 | AN | 0.1 | BD | 0.1 | | | Methylene chloride. | 31 | 40 | 18 | 1.62 | 15 | 8.75 | 78.81 | 11.07 | | | |
| 36 | AlEt3 | 2 | CCl3COOH | 2 | TiCl4 | 0.2 | AN | 0.1 | BD | 0.1 | | | Toluene | 31 | 40 | 18 | 2.03 | 19 | | | | | | |
| 37 | AlEt3 | 2 | CCl3COOH | 2 | TiCl4 | 0.2 | AN | 0.1 | BD | 0.1 | | | Heptane | 32 | 40 | 18 | 5.45 | 51 | 8.01 | 72.22 | 12.63 | | | |
| 38 | AlEt3 | 2 | CCl3COOH | 2 | TiCl4 | 0.2 | AN | 0.1 | BD | 0.1 | | | Toluene | 29 | 40 | 18 | 1.82 | 17 | 8.76 | 79.26 | 10.92 | | | (3). |
| 39 | AlEt3 | 2 | CCl2COOH | 2 | TiCl4 | 0.2 | AN | 0.2 | BD | 0.1 | | | do | 23 | 40 | 18 | 4.32 | *40 | 8.47 | 76.34 | 11.76 | | | |
| 40 | AlEt3 | 2 | CCl3COOH | 2 | TiCl4 | 0.2 | AN | 0.3 | BD | 0.1 | | | do | 16 | 40 | 18 | 6.28 | *59 | 8.70 | 76.98 | 12.84 | | | (*). |
| 41 | AlEt3 | 2 | CCl3COOH | 2 | TiCl4 | 0.2 | AN | 0.4 | BD | 0.1 | | | do | 10 | 40 | 18 | 8.10 | *76 | 7.95 | 77.16 | 13.25 | | | |
| 42 | AlEt3 | 2 | CCl3COOH | 2 | TiCl4 | 0.2 | AN | 0.5 | BD | 0.1 | | | do | 4 | 40 | 18 | 11.90 | *111 | 8.91 | 76.63 | 14.48 | | | |
| 43 | AlEt3 | 2 | CCl3COOH | 2 | Ti(OBu)4 | 0.2 | AN | 0.1 | IP | 0.1 | | | do | 26 | 50 | 18 | 2.98 | 25 | 9.17 | 78.27 | 9.42 | | | (4). |
| 44 | AlEt3 | 2 | CCl3COOH | 2 | Ti(OBu)4 | 0.2 | AN | 0.1 | CP | 0.1 | | | do | 25 | 50 | 18 | 8.22 | 58 | 5.75 | 55.16 | 3.48 | 33.49 | | (5). |
| 45 | AlEt3 | 2 | CCl3COOH | 2 | Ti(OBu)4 | 0.2 | MMA | 0.1 | BD | 0.1 | | | do | 24 | 50 | 18 | 2.24 | 15 | 9.35 | 71.03 | | | 19.62 | (6). |
| 46 | AlEt3 | 2 | CCl3COOH | 2 | Ti(OBu)4 | 0.2 | MMA | 0.1 | IP | 0.1 | | | do | 23 | 50 | 18 | 1.90 | 11 | 9.79 | 73.65 | | | 16.56 | (7). |
| 47 | AlEt3 | 2 | CCl3COOH | 2 | Ti(OBu)4 | 0.2 | MMA | 0.1 | CP | 0.1 | | | do | 24 | 50 | 18 | 7.62 | 40 | 6.14 | 57.11 | | 31.46 | | (8). |
| 48 | AlEt3 | 2 | CCl3COOH | 2 | Ti(OBu)4 | 0.2 | MAN | 0.1 | BD | 0.1 | | | do | 27 | 50 | 18 | 1.88 | 16 | 9.38 | 78.99 | 9.39 | | | (4). |
| 49 | AlEt3 | 2 | CCl3COOH | 2 | Ti(OBu)4 | 0.2 | MAN | 0.05 | BD | 0.05 | | | do | 30 | 50 | 18 | 6.00 | 79 | 5.35 | 62.48 | | | 32.17 | (9). |
| 50 | AlEt3 | 2 | CCl3COOH | 2 | Ti(OBu)4 | 0.2 | AN | 0.1 | BD | 0.05 | CP | 0.05 | do | 25 | 50 | 18 | 8.01 | 67 | 6.29 | 59.57 | 3.25 | 28.29 | | |
| 51 | AlEt3 | 2 | CCl3COOH | 2 | Ti(OBu)4 | 0.2 | AN | 0.1 | BD | 0.05 | ST | 0.05 | do | 25 | 50 | 18 | 4.82 | 37 | 7.89 | 78.86 | 9.02 | | | |
| 52 | AlEt3 | 2 | CCl3COOH | 2 | Ti(OBu)4 | 0.2 | AN | 0.1 | IP | 0.05 | ST | 0.05 | do | 25 | 50 | 18 | 3.72 | 33 | 9.00 | 79.09 | 8.41 | | | |
| 53 | AlEt3 | 2 | CCl3COOH | 2 | Ti(OBu)4 | 0.2 | AN | 0.1 | CP | 0.05 | ST | 0.05 | do | 25 | 50 | 18 | 6.40 | 52 | 6.17 | 62.78 | 4.75 | 23.55 | | |
| 54 | AlEt3 | 2 | CCl3COOH | 2 | Ti(OBu)4 | 0.2 | MMA | 0.1 | BD | 0.05 | ST | 0.05 | do | 23 | 50 | 18 | 3.71 | 20 | 8.18 | 71.18 | | | | |
| 55 | AlEt3 | 2 | CCl3COOH | 2 | Ti(OBu)4 | 0.2 | MMA | 0.1 | IP | 0.05 | ST | 0.05 | do | 23 | 50 | 18 | 2.44 | 13 | 9.13 | 74.03 | | | | |
| 56 | AlEt3 | 2 | CCl3COOH | 2 | Ti(OBu)4 | 0.2 | AN | 0.075 | BD | 0.1 | MMA | 0.025 | do | 30 | 40 | 18 | 1.33 | 11 | 9.10 | 76.66 | 8.36 | | 5.56 | |
| 57 | AlEt3 | 2 | CCl3COOH | 2 | Ni(AcAc)2 | 0.1 | AN | 0.1 | BD | 0.1 | | | do | 23 | 40 | 18 | 0.83 | 8 | 8.34 | 76.44 | 11.70 | | | |
| 58 | AlEt3 | 2 | CCl3COOH | 2 | Ni(AcAc)2 | 0.1 | AN | 0.1 | BD | 0.1 | | | do | 23 | 75 | 18 | 4.89 | 52 | | | | | | |
| 59 | AlEt3 | 2 | CCl3COOH | 2 | Fe(AcAc)3 | 0.1 | AN | 0.1 | BD | 0.1 | | | do | 23 | 40 | 18 | 1.87 | 17.5 | 8.54 | 77.48 | 11.13 | | | |
| 60 | AlEt3 | 2 | CCl3COOH | 2 | Fe(AcAc)3 | 0.1 | AN | 0.1 | BD | 0.1 | | | do | 23 | 75 | 18 | 8.07 | 75 | | | | | | |

| Example number | Catalyst | | | Monomer | | | Copolymerization condition | | | Yield | | Analysis, percent | | | | | Note |
|---|---|---|---|---|---|---|---|---|---|---|---|---|---|---|---|---|---|
| | Component A (m.mole) | Component B (m.mole) | Component C (m.mole) | Conjugated heterodiene, mole | Conjugated diene, mole | | Solvent, ml. | Temp. (°C.) | Time (hrs.) | Gr. | Percent | H | C | N | Cl | O | |
| 61 | AlEt₃ 2 | CCl₃COOH 2 | Fe(OBuⁿ)₃ 2 | AN 0.2 | BD 0.1 | | do | 40 | 18 | 3.02 | 28 | 8.48 | 74.67 | 10.00 | | | |
| 62 | AlEt₃ 2 | CCl₃COOH 1 | Fe(OBuⁿ)₃ 2 | AN 0.2 | BD 0.3 | | do | 40 | 18 | 10.13 | 95 | 8.10 | 76.08 | 13.91 | | | (*) |
| 63 | AlEt₃ 2 | CCl₃COOH 2 | Fe-Oct. 1.6 | AN 0.2 | BD 0.2 | | do | 40 | 18 | 3.44 | 32 | 8.81 | 73.40 | 9.72 | | | |
| 64 | AlEt₃ 2 | CCl₃COOH 2 | FeCl₃*** 2 | AN 0.2 | BD 0.1 | | do | 40 | 18 | 2.91 | 27 | 8.98 | 75.74 | 11.29 | | | |
| 65 | AlEt₃ 2 | CCl₃COOH 2 | Fe-Ste. 2 | AN 0.2 | BD 0.1 | | do | 40 | 18 | 2.64 | 25 | 8.69 | 76.71 | 10.29 | | | |
| 66 | Al/Bu 2.0 | CCl₃COOH 2 | Fe(OBu)₃ 2 | AN 0.2 | BD 0.1 | | do | 40 | 18 | 1.93 | 18 | 8.78 | 78.40 | 10.60 | | | |
| 67 | Al/Bu 0.2 | CCl₃COOH 2 | Fe(OBu)₃ 2 | AN 0.2 | BD 0.1 | | do | 40 | 18 | 2.49 | 23 | 8.63 | 76.23 | 10.25 | | | |
| 68 | AlEt₃ 0.2 | CCl₃CN 2 | Fe(OBu)₃ 2 | AN 0.2 | BD 0.1 | | do | 40 | 17 | 1.55 | 14.5 | 7.70 | 74.75 | 11.27 | | | |
| 69 | AlEt₃ 2 | CHCl₂COOH 2.0 | Fe(OBu)₃ 2 | AN 0.2 | BD 0.1 | | do | 40 | 18 | 1.46 | 14 | | | | | | |
| 70 | AlEt₃ 2 | CCl₃COOH (¹²) | Fe(OBu)₃ 2 | AN 0.2 | BD 0.1 | | do | 40 | 18 | 2.09 | 19.5 | | | | | | |
| 71 | AlFt₃ 2 | CCl₃COOH 2 | Fe(OBu)₃ 2 | AN 0.2 | BD 0.1 | | do | 40 | 18 | 1.48 | 14 | | | | | | |
| 72 | AlEt₃ 2 | CCl₃COOH 2 | Fe(OBu)₃ 1.0 | AN 0.2 | BD 0.1 | | do | 40 | 18 | 3.02 | 28 | 8.43 | 76.83 | 12.71 | | | |
| 73 | AlEt₃ 2 | CCl₃COOH 2 | Fe(OBu)₃ 2.0 | AN 0.2 | BD 0.3 | | do | 53 | 18 | 7.30 | 68 | 8.15 | 75.06 | 13.48 | | | |
| 74 | AlEt₃ 2 | CCl₃COOH 2 | Fe(OBu)₃ 3.0 | AN 0.2 | BD 0.3 | | do | 53 | 18 | 11.92 | 110 | 8.12 | 76.01 | 13.24 | | | |
| 75 | AlEt₃ 2 | CCl₃COOH 2 | Fe(OBu)₃ 4.0 | AN 0.2 | BD 0.3 | | do | 53 | 18 | 9.88 | 93 | 8.14 | 74.57 | 12.73 | | | |
| 76 | AlEt₃ 2 | CCl₃COOH 2 | Fe(OBu)₃ 2 | AN 0.2 | BD 0.3 | | do | 53 | 18 | 9.20 | 86 | 8.20 | 74.11 | 12.36 | | | |
| 77 | AlEt₃ 2 | CCl₃COOH 2 | Fe(OBu)₃ 2 | AN 0.2 | BD 0.3 | | do | 53 | 18 | 7.92 | 74 | 8.26 | 75.33 | 13.17 | | | |
| 78 | AlEt₃ 2 | CCl₃COOH 2 | Fe(OBu)₃ 2 | AN 0.2 | BD 0.3 | | Toluene | 16 | 18 | 12.10 | 113 | 8.46 | 76.82 | 12.66 | | | |
| 79 | AlEt₃ 2 | CCl₃COOH 2 | Fe(OBu)₃ 2 | AN 0.02 | BD 0.3 | | do | 18 | 18 | 4.32 | 40 | 8.53 | 77.52 | 12.22 | | | |
| 80 | AlEt₃ 2 | CCl₃COOH 2 | Fe(OBu)₃ 2 | AN 0.002 | BD 0.3 | | do | 18 | 18 | 1.30 | 12 | | | | | | |
| 81 | AlEt₃ 2 | CCl₃COOH 2 | Ti(OBu)₄ 1 | AN 0.1 | BD 0.3 | | do | 19 | 18 | 4.56 | 42.5 | | | | | | (¹⁰) |
| 82 | AlEt₃ 0.5 | CCl₃COOH 2 | Fe(OBu)₃ 0.5 | AN 0.95 | BD 0.3 | | do | 20 | 18 | 2.30 | 21.5 | | | | | | |
| 83 | AlEt₃ 0.1 | CCl₃COOH 2 | Fe(OBu)₃ 0.1 | AN 0.01 | BD 0.1 | | CH₂Cl₂ | 21 | 18 | 0.62 | 5.8 | 8.52 | 77.82 | 12.38 | | | |
| 84 | AlEt₃ 2 | CCl₃COOH 2 | Fe(OBu)₃ 2 | AN 0.2 | BD 0.3 | | Toluene | 31 | 18 | 3.21 | 30 | 8.58 | 77.31 | 10.22 | | | |
| 85 | AlEt₃ 2 | CCl₃COOH 2 | Fe(OBu)₃ 2 | AN 0.2 | BD 0.3 | | Heptane | 32 | 18 | 9.47 | 89 | 8.17 | 75.45 | 13.25 | | | |
| 86 | AlEt₃ 2 | CCl₃COOH 2 | Fe(OBu)₃ 2 | AN 0.2 | BD 0.3 | | Toluene | 23 | 18 | 3.02 | 28 | 8.48 | 74.67 | 10.00 | | | |
| 87 | AlEt₃ 2 | CCl₃COOH 2 | Fe(OBu)₃ 2 | AN 0.2 | BD 0.3 | | do | 16 | 18 | 6.57 | *61 | 8.50 | 77.85 | 11.85 | | | |
| 88 | AlEt₃ 2 | CCl₃COOH 2 | Fe(OBu)₃ 2 | AN 0.2 | BD 0.4 | | do | 10 | 18 | 10.13 | *95 | 8.10 | 76.08 | 13.91 | | | |
| 89 | AlEt₃ 2 | CCl₃COOH 2 | Fe(OBu)₃ 2 | AN 0.2 | BD 0.5 | | do | 4 | 18 | 12.30 | *115 | 8.04 | 75.89 | 13.51 | | | |
| 90 | AlEt₃ 2 | CCl₃COOH 2 | Fe(OBu)₃ 2 | AN 0.2 | BD 0.1 | | do | 28 | 18 | 7.06 | 50 | 8.12 | 75.81 | 13.72 | | | |
| 91 | AlEt₃ 2 | CCl₃COOH 2 | Fe(OBu)₃ 2 | AN 0.2 | CP 0.1 | | do | 27 | 18 | 1.50 | 12.5 | | | | | | |
| 92 | AlEt₃ 2 | CCl₃COOH 2 | Fe(OBu)₃ 2 | AN 0.2 | IP 0.1 | | do | 30 | 18 | 2.19 | 18 | | | | | | |
| 93 | AlEt₃ 2 | CCl₃COOH 2 | Fe(OBu)₃ 2 | MAN 0.1 | BD 0.1 | MMA 0.1 | do | 40 | 18 | 1.82 | 15 | 8.83 | 74.33 | 8.16 | | | |
| 94 | AlEt₃ 2 | CCl₃COOH 2 | Fe(OBu)₃ 2 | AN 0.075 | BD 0.05 | CP 0.05 | 0.025 | 28 | 18 | 4.53 | 36.5 | | | | | 5.20 | (¹) |
| 95 | AlEt₃ 2 | CCl₃COOH 2 | Fe(OBu)₃ 2 | AN 0.2 | BD 0.1 | ST 0.05 | 0.05 | 28 | 18 | 2.65 | 20 | | | | | | |
| 96 | AlEt₃ 2 | CCl₃COOH 2 | Fe(OBu)₃ 2 | AN 0.1 | IP 0.1 | ST 0.05 | 0.50 | 23 | 18 | 1.65 | 8.9 | | | | | | |
| 97 | AlEt₃ 2 | CCl₃COOH 2 | Fe(OBu)₃ 2 | MMA 0.2 | BD 0.1 | IB 0.05 | 0.05 | 29 | 18 | 1.24 | 11.5 | | | | | | |
| 98 | AlEt₃ 2 | CCl₃COOH 2 | Fe(OBu)₃ 2 | AN 0.2 | BD 0.3 | | do | 16 | 18 | 5.26 | | | | | | | |
| 99 | AlEt₂ 2 | CCl₃COOH 2 | Ti(OBu)₄ 2 | AN 0.2 | BD 0.1 | | do | 16 | 18 | 0.43 | | | | | | | |
| 100 | AlEt₃ 2 | CCl₃COOH 2 | Ti(OBu)₄ 2 | AN 0.2 | BD 0.3 | | do | 16 | 18 | 3.85 | | | | | | | |
| 101 | AlEt₃ 2 | CCl₃CONH₂,¹¹ 2 | Fe(OBu)₃ 2 | AN 0.2 | BD 0.1 | | do | 16 | 18 | 0.66 | | | | | | | |
| 102 | AlEt₃ 2 | CCl₃C₆H₁CH(CCl₃)·C₆H₅Cl 2 | Fe(OBu)₃ 2 | AN 0.2 | BD 0.3 | | do | 16 | 18 | | | | | | | | |
| 103 | AlEt₃ 2 | ClC₆H₁CH(CCl₃)·C₆H₅Cl 2 | Fe(OBu)₃ 2 | AN 0.2 | BD 0.3 | | do | 16 | 18 | | | | | | | | |

¹ Where the ratio of monomer units, AN/BD equals to 1:1, the calculation analysis: H, 8.47; C, 78.46; N, 13.07.
² VOCl₃ is added in a form of 0.01 molar solution.
³ In Examples 38 through 42, a successive addition of toluene, AN, TCA, Ti, Al and BD.
⁴ Calculation analysis: H, 9.15; C, 79.29; N, 11.56.
⁵ Calculation analysis: H, 5.69; C, 59.38; N, 9.89; Cl, 25.04.
⁶ Calculation analysis: H, 9.15; C, 70.10; O, 20.75.
⁷ Calculation analysis: H, 9.59; C, 71.39; O, 19.02.
⁸ Calculation analysis: H, 6.95; C, 57.30; Cl, 18.79.
⁹ Calculation analysis: H, 5.30; C, 63.15; O, 31.55.
¹⁰ In Examples 85 and 86, a successive addition of toluene, AN, TCA, Fe, Al and BD.
¹¹ Added in suspension.
¹² Chloral.
*Calculated by the sum of 0.1 molar AN and 0.1 molar BD.
**Calculated by the sum of 0.1 molar BD and 0.1 molar AN, 10.7. gr.
***Added in solid state.

What is claimed is:

1. A process for preparing conjugated compounds polymers which comprises contacting a monomeric material selected from the group consisting of (1) a mixture of at least two conjugated compounds selected from conjugated dienes (D) and conjugated heterodienes (H) and (2) a mixture of at least one conjugated diene (D), at least one conjugated heterodiene (H) and at least one monoolefin or derivative thereof (O) with a catalyst comprising component A of the formula:

$$Al R^1 R^2 R^3$$

where $R^1$ and $R^2$ are, similar or dissimilar, selected from the group consisting of alkyl, cycloalkyl, aryl, aralkyl and alkoxy and $R^3$ is selected from the group consisting of hydrogen, alkyl, cycloalkyl, aryl, aralkyl and alkoxy, component B selected from the group consisting of halogenated organic acids, halogenated organic acid esters, halogenated aldehydes, halogenated alcohols, halogenated ethers, halogenated nitriles, halogenated acid halides, and halogenated acid amides, and component C selected from the group consisting of halides, sulfates, nitrates, carbonates, phosphates, cyanides, thiocyanides, sulfides, hydroxides, oxides, oxyhalides, alkoxides, acid esters, organic acid salts, complex compounds having as ligand phosphine, phosphite, carbonyl, isonitrile, dipyridyl, vinyl compound, cyclopentadienyl, π-allyl, acetylacetone, and acetoacetic acid ester of iron, cobalt, nickel, ruthenium, rhodium, and palladium.

2. A process as claimed in claim 1 in which the component B is the compound having a trihalomethyl group.

3. A process for preparing conjugated compounds polymers which comprises contacting a monomeric material selected from the group consisting of (1) a mixture of at least two conjugated compounds selected from conjugated dienes (D) and conjugated heterodienes (H) and (2) a mixture of at least one conjugated diene (D), at least one conjugated heterodiene (H) and at least one monoolefin or derivative thereof (O) with a catalyst comprising component A of the formula:

$$Al R^1 R^2 R^3$$

where $R^1$ and $R^2$ are, similar or dissimilar, selected from the group consisting of alkyl, cycloalkyl, aryl, aralkyl and alkoxy and $R^3$ is selected from the group consisting of hydrogen, alkyl, cycloalkyl, aryl, aralkyl and alkoxy, component B selected from the group consisting of trichloroacetic acid, dichloroacetic acid, monochloroacetic acid, tribromoacetic acid, trifluoroacetic acid, ethyl trichloroacetate, ethyl tribromoacetate, ethyl trifluoro-acetate, chloral, bromal, 2,2,2-trichloroethanol, 2,2,2-trichlorodiethyl ether, trichloroacetonitrile, trichloroacetyl chloride, and trichloroacetamide, and component C selected from the group consisting of $FeCl_3$, $Fe(OC_4H_9)_3$, $Fe(C_5H_7O_2)_3$, Fe(octoate), Fe(stearate), $Fe(C_5H_5)_2$, $CoCl_2$, $Co(C_5H_{72})_3$, $NiCl_2$, and $Ni(C_5H_7O_2)_2$.

4. A process as claimed in claim 1 wherein the mixture of at least two conjugated compounds is a combination of a conjugated diene and a conjugated heterodiene.

5. A process as claimed in claim 1 wherein the conjugated dienes (D) are conjugated dienes having four to 12 carbon atoms selected from straight chain, branched chain and ring form.

6. A process as claimed in claim 5 wherein the conjugated dienes are selected from the group consisting of butadiene, pentadiene, hexadiene, heptadiene, octadiene, isoprene, 2-ethylbutadiene, 2-tert-butylbutadiene, 3-methyl-heptatriene-1, 4, 6, cyclohexadiene, cyclopentadiene, chloroprene and 2,3-dichlorobutadiene.

7. A process as claimed in claim 1 wherein the conjugated heterodienes are selected from the group consisting of a compound having the formula:

$$\overset{R^4}{C}H=\overset{R^5}{C}-\overset{Y}{C}=Z$$

and a compound having the formula:

$$\overset{R^6}{C}H=\overset{R^7}{C}-C\equiv N$$

where $R^4$, $R^5$, $R^6$ and $R^7$ are, similar or dissimilar, selected from the group consisting of hydrogen, halogen, alkyl, aryl, aralkyl, nitrile, $-COOR^{21}$ (where $R^{21}$ is selected from the group consisting of hydrogen, alkyl, cycloalkyl, aryl and aralkyl) and hydrocarbon residue having a substituent selected from the group consisting of halogen and $-COOR^{21}$ where $R^{21}$ is as defined above: Y is selected from the group consisting of halogen, $-R^{22}$, $-OR^{23}$, $-NR^{24}R^{25}$ and $-SR^{26}$ where $R^{22}$, $R^{23}$, $R^{24}$, $R^{25}$ and $R^{26}$ are, similar or dissimilar, selected from the group consisting of hydrogen, alkyl, cycloalkyl, aryl, and aralkyl; and Z is selected from the group consisting of oxygen and sulfur; and further when the conjugated heterodienes of the above formulas have a carboxyl group, the corresponding anhydride is also included.

8. A process as claimed in claim 7 wherein the conjugated heterodienes are selected from the group consisting of acrylic acid, methacrylic acid, crotonic acid, cinnamic acid, maleic acid, fumaric acid, itaconic acid, maleic anhydride, methyl acrylate, ethyl acrylate, butyl acrylate, octyl acrylate, methyl methacrylate, ethyl methacrylate, butyl methacrylate, octyl methacrylate, methyl crotonate, methyl cinnamate, monoethyl maleate, dimethyl maleate, monoethyl fumarate, dimethyl fumarate, ethyl itaconate, diethyl itaconate, acrolein, methacrolein, acryloyl chloride, acrylamide, methacrylamide, methyl vinyl ketone, methyl isopropyl ketone, acrylonitrile, methacrylo-nitrile, chloroacrylonitrile and vinylidene cyanide.

9. A process as claimed in claim 1 wherein the monoolefin or derivative thereof contains from two to 16 carbon atoms.

10. A process as claimed in claim 9 wherein the monoolefin or derivative thereof containing two to 16 carbon atoms is selected from the group consisting of ethylene, propylene, butene-1, butene-2, isobutene, pentene-1, pentene-2, 2-methylbutene-1, 3-methylbutene-1, 2-methyl-butene-2, hexene-1, hexene-2, 2-methylpentene-1, dodecene-1, cyclobutene, cyclopentene, cyclooctene, norbornene, indene, styrene, α-methyl styrene, vinyl toluene, vinyl naphthalene, N-vinyl carbazole, vinyl acetate, vinyl propionate, methyl vinyl ether, ethyl vinyl ether, isobutyl vinyl ether, vinyl chloride, and vinylidene chloride.

* * * * *